No. 819,145. PATENTED MAY 1, 1906.
H. G. KRAUSS.
GREEN MALT TURNING MACHINE.
APPLICATION FILED JUNE 13, 1905.

2 SHEETS—SHEET 1.

Witnesses
Robert K. Perkins
Stephen F. Dougherty

Inventor
Hans G. Krauss
by Warren E. Willis
Attorney

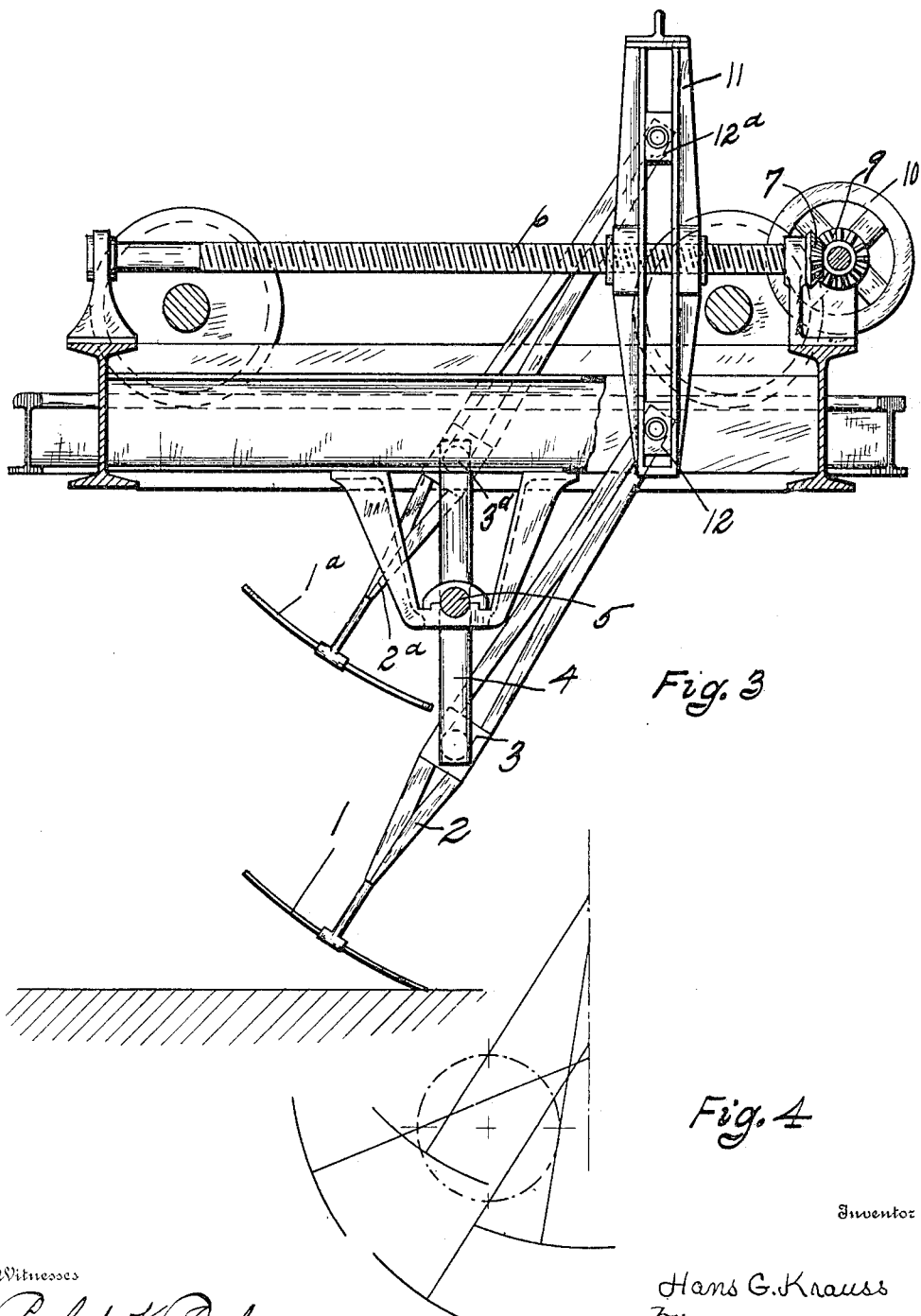

UNITED STATES PATENT OFFICE.

HANS G. KRAUSS, OF ALTOONA, PENNSYLVANIA.

GREEN-MALT-TURNING MACHINE.

No. 819,145.     Specification of Letters Patent.     Patented May 1, 1906.

Application filed June 13, 1905. Serial No. 265,109.

*To all whom it may concern:*

Be it known that I, HANS G. KRAUSS, a subject of the German Emperor, residing at Altoona, in the county of Blair and State of Pennsylvania, have invented new and useful Green-Malt-Turning Machines, of which the following is a specification.

This invention relates to improvements in green-malt-turning machines, in which broad shovels are used to stir and turn the grain during the process of curing and preparing the same.

It has for its objects, first, the production of mechanical means for manipulating shovels so that the same shall enter the grain either vertically or at an angle to the surface thereof, as may be desired; second, to produce a mechanism that effectually loosens and turns the grain and which will not compress or pack that which it has passed over; third, to produce a mechanism that is readily adjustable in its operations, does not require skilled labor to control, is quiet in operating, and which will work uniformly under varying conditions. These and other minor objects are attained by the novel combination of parts hereinafter fully described, and shown in the accompanying drawings, in which—

Figure 1:
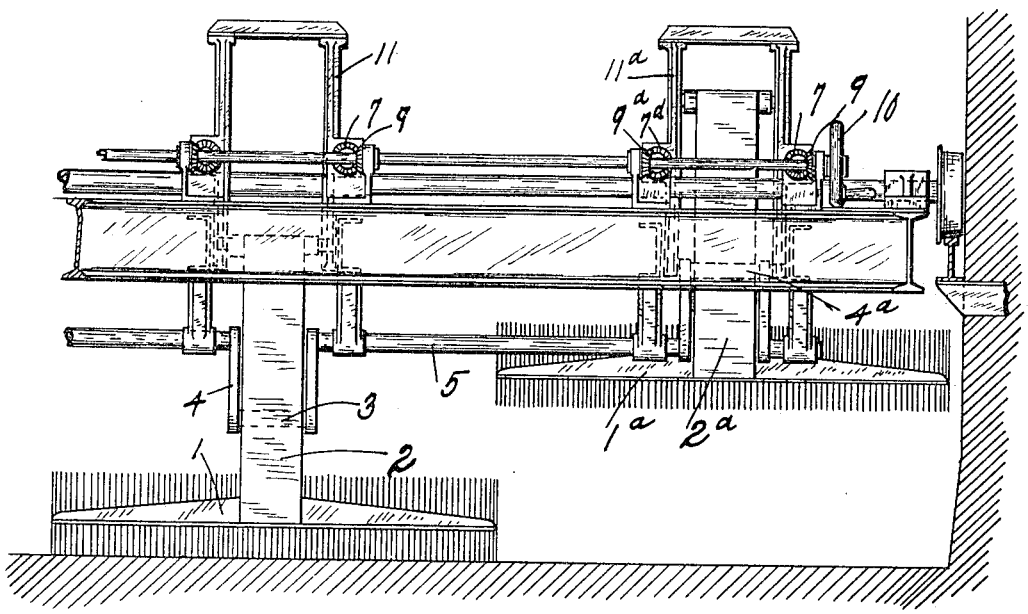
Figure 2:
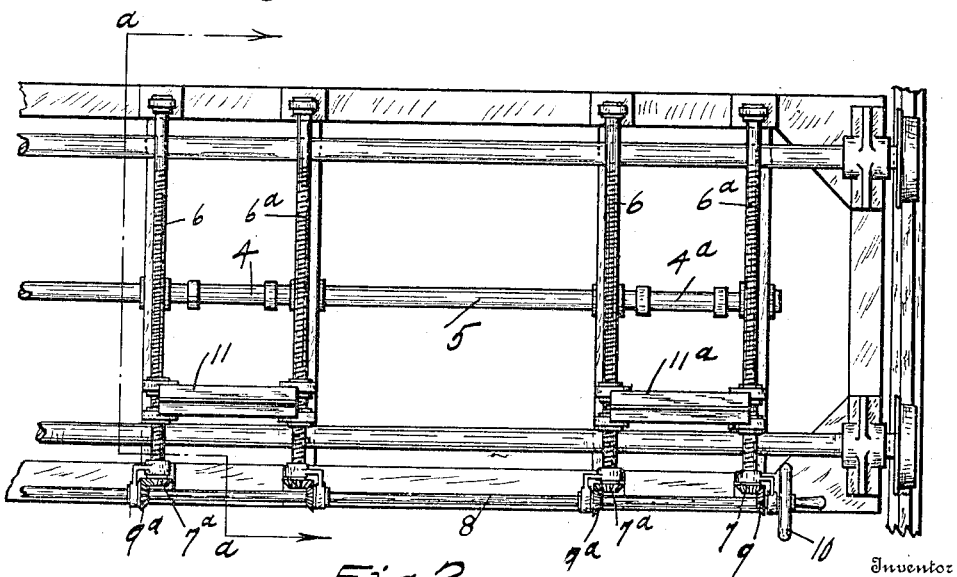

Figure 1 is a front elevation of the mechanism broken away on one end. Fig. 2 is a plan view thereof. Fig. 3 is a vertical section on line $a\ a$ of Fig. 2, and Fig. 4 is a diagrammatic view illustrating the extreme and mid positions of the shovels.

Similar characters refer to similar parts throughout the several views.

Existing machines for turning malt are usually comprised of a series of shovels operated by cranks and guided at their upper end by fixed guideways positioned above the crank-center. In my invention the guideways are located at the side of the cranks and are adjustable thereto in such manner as to control the action of the shovels in their approach and entrance to the grain, rise therefrom, and distribution of the same in conformity to hand-work, the path of travel of shovels being controlled by the relative positions of crank and guideways, as will be readily understood from inspection of Fig. 4.

My invention consists of a suitable frame adapted to move on trackways affixed to the walls of a malt-room. From the frame depend shovels 1 and $1^a$, presenting a straight edge and level surface to the malt. These shovels are supported by the beams 2 and $2^a$, to which they are rigidly connected. Midway in length of the beams are bearings 3 and $3^a$ for the cranks 4 and $4^a$, which are located at opposite points on the shaft 5 in such manner that the cranks and attached parts are balanced, one shovel being raised while its opposite is lowered.

The crank-shaft 5 may have any number of shovels attached that may be desired. It rests in suitable bearings arranged centrally in the frame of the machine and transverse to the direction of its travel. The crank-shaft may be rotated by any convenient means, as an electric motor.

At right angles to the crank-shaft and on both sides of each crank are the screw-threaded rods 6 and $6^a$, having bearings at the front and rear of the machine-frame. Beyond the bearings the rods extend at the front of the machine and have secured to them the bevel-gears 7 and $7^a$.

Another shaft 8, journaled in the frame at right angles to the threaded rods, has appropriately-positioned corresponding bevel-gears 9 and $9^a$, adapted to mesh with gears 7 and $7^a$. Also on the shaft 8 at a point convenient to operate is a hand-wheel 10 or similar arrangement for turning the shaft and by reason of such turning transmit revolution to the threaded rods 6 and $6^a$.

Carried by the threaded rods are guideways or cross-heads 11 and $11^a$, in which are adapted to freely slide blocks 12 and $12^a$, to which are connected the upper ends of the shovel-beams 2 and $2^a$.

In operation the entire frame is caused to move gradually forward, its speed depending on the action of the shovels in working the grain. Power is applied to the crank-shafts, causing the shovels to describe a gyratory path, elliptical in shape, the radii of which is changed as the guideways are moved with reference to the central position of the crank-shaft. The result, evidently, of such movement is to give the shovels a motion attained hitherto only by hand in entering, raising, and turning the malt.

Having thus described my invention, what I claim, and desire to secure by Letters Patent of the United States, is—

1. In a machine of the class described, the combination with a frame, shovels carried thereby and means for giving a reciprocating action to said shovels, of means for changing the angularity of such said reciprocating action of shovels, all substantially as shown and described.

2. In a machine of the character described, a suitable frame, a rotatable shaft journaled therein, cranks on said shaft, one or more suitable shovels suspended from said frame, means of suspension between said shovels and cranks, adjustable guideways attached to said frame, blocks slidable within said guideways, connected to upper ends of said shovels, and means for locating and securing said guideways adjustably on said frame, all substantially as shown and described.

3. In a machine of the character described, a movable frame, cross-bars within the frame, vertical guideways adjustable on said cross-bars, means for changing the position of said guideways, slides contained with the guideways, a power-driven shaft journaled in the frame, cranks disposed thereon, one or more suitable shovels depending from said frame, having their upper ends connected to said slides, and connecting-rods between said shovels and cranks, all substantially as shown and described.

4. In a machine of the character described, a truck-supported frame adapted to travel on a suitable trackway, screw-threaded cross-bars journaled in said frame, vertically-disposed cross-heads movably mounted on said cross-bars and operative thereby, means for revolving said cross-bars, a shaft central with said frame, cranks mounted thereon, slides within said cross-heads, shovels connected at their upper end to said slides and a pitman attached to said shovel and to said crank, all substantially as shown and described.

5. In a machine of the class described, a movable frame, screw-threaded bars journaled therein, bevel-gears centered on the ends of said bars, a shaft journaled in said frame, above and at a right angle thereto, bevel-gears centered thereon adapted to mesh with the aforesaid bevel-gear, means for operating said shaft, a second shaft central with said frame, cranks mounted thereon, slides within said cross-heads, shovels connected at their upper end to said slides and a pitman attached to said shovel and to said crank, all substantially as shown and described.

In testimony whereof I have signed my name to this specification in the presence of two subscribing witnesses.

HANS G. KRAUSS.

Witnesses:
BERT LARZEBOE,
FRANK A. GILLETTE.